United States Patent
Arimilli et al.

(10) Patent No.: US 6,178,485 B1
(45) Date of Patent: Jan. 23, 2001

(54) METHOD AND APPARATUS FOR EXECUTING SINGLY-INITIATED, SINGLY-SOURCED VARIABLE DELAY SYSTEM BUS OPERATIONS OF DIFFERING CHARACTER

(75) Inventors: Ravi Kumar Arimilli; Derek Edward Williams, both of Austin; John Michael Kaiser, deceased, late of Cedar Park, all of TX (US), by Eileen T. Kaiser, administratrix

(73) Assignee: International Business Machines Corporation, Armonk, NY (US)

(*) Notice: Under 35 U.S.C. 154(b), the term of this patent shall be extended for 0 days.

(21) Appl. No.: 09/114,187

(22) Filed: Jul. 13, 1998

(51) Int. Cl.⁷ .................................................... G06F 12/00
(52) U.S. Cl. .......................... 711/146; 711/144; 711/145; 710/107
(58) Field of Search .......................... 710/107; 711/146, 711/144, 145, 122

(56) References Cited

U.S. PATENT DOCUMENTS

| | | | |
|---|---|---|---|
| 5,553,266 | * 9/1996 | Metzger et al. | 711/144 |
| 5,713,004 | * 1/1998 | Kimmel et al. | 711/145 |
| 5,781,757 | * 7/1998 | Deshpande | 711/146 |
| 5,797,026 | * 8/1998 | Rhodehamel et al. | 712/1 |
| 5,829,040 | * 10/1998 | Son | 711/146 |
| 5,926,830 | * 7/1999 | Feiste | 711/122 |

* cited by examiner

*Primary Examiner*—Do Hyun Yoo
*Assistant Examiner*—Mehdi Namazi
(74) *Attorney, Agent, or Firm*—Richard A. Henkler; Mark E. McBurney

(57) ABSTRACT

The present invention is a method and apparatus for preventing the occurrence of deadlocks from the execution of singly-initiated singly-sourced variable delay system bus operations. In general, each snooper excepts a given operation at the same time according to an agreed upon condition. In other words, the snooper in a given cache can accept an operation and begin working on it even while retrying the operation. Furthermore, none of the active snoopers release an operation until all the active snoopers are done with the operation. In other words, execution of a given operation is started by the snoopers at the same time and finished by each of the snoopers at the same time. This prevents the ping-pong deadlock by keeping any one cache from finishing the operation before any of the others.

8 Claims, 6 Drawing Sheets

METHOD AND APPARATUS FOR EXECUTING SINGLY-INITIATED, SINGLY-SOURCED VARIABLE DELAY SYSTEM BUS OPERATIONS OF DIFFERING CHARACTER

BACKGROUND

CROSS-REFERENCE TO RELATED APPLICATIONS

The present patent application is related to Ser. No. 09/004,144, entitled "METHOD AND APPARATUS FOR EXECUTING MULTIPLY-INITIATED MULTIPLY-SOURCED VARIABLE DELAY SYSTEM BUS OPERATIONS" (Attorney Docket No. AT997814) which is hereby incorporated by reference herein.

The present patent application is related to Ser. No. 09/004,137, entitled "METHOD AND APPARATUS FOR EXECUTING MULTIPLY-INITIATED, SINGLY-SOURCED VARIABLE DELAY SYSTEM BUS OPERATIONS" (Attorney Docket No. AT997808) which is hereby incorporated by reference herein.

The present patent application is related to Ser. No. 09/004,146, entitled "METHOD AND APPARATUS FOR EXECUTING SINGLY-INITIATED, MULTIPLY-SOURCED VARIABLE DELAY SYSTEM BUS OPERATIONS" (Attorney Docket No. AT997497) which is hereby incorporated by reference herein.

The present patent application is related to Ser. No. 09/004,148, entitled "METHOD AND APPARATUS FOR EXECUTING MULTIPLY-INITIATED, MULTIPLY-SOURCED VARIABLE DELAY SYSTEM BUS OPERATIONS" (Attorney Docket No. AT996271) which is hereby incorporated by reference herein.

The present patent application is related to Ser. No. 09/004,147, entitled "METHOD AND APPARATUS FOR EXECUTING VARIABLE DELAY SYSTEM BUS OPERATIONS OF DIFFERING CHARACTER USING SHARED BUFFERS" (Attorney Docket No. AT997496) which is hereby incorporated by reference herein.

The present patent application is related to Ser. No. 09/004,149, entitled "METHOD AND APPARATUS FOR EXECUTING SINGLY-INITIATED SINGLY-SOURCED VARIABLE DELAY SYSTEM BUS OPERATIONS" (Attorney Docket No. AT996272) which is hereby incorporated by reference herein.

1. Field of the Present Invention

The present invention generally relates to data processing systems, and more specifically, to methods and apparatuses residing in such systems that prevent the occurrence of deadlock from the execution of singly-initiated singly-sourced variable delay system bus operations.

2. History of Related Art

The evolution of the computer industry has been driven by the insatiable appetite of the consumer for ever increased speed and functionality. One species which has evolved from the above is the multi-processor computer.

Multi-processor systems, in similarity to other types of computer systems, have many different areas that are ripe for improvements. One such area is the processing of variable delay system bus operations.

Modern multi-processor systems typically include a number of processing elements, and a main memory, each of which are connected by a series of buses that ultimately terminate in a common system bus. The processing elements usually include a processor having a predetermined amount of on-board cache and, in some cases, a cache hierarchy. The cache hierarchy, typically, includes a number of caches (e.g. level 0–2) which are interposed between the processor and the common system bus.

In general, operations, in such multi-processor systems, are performed by the processor, residing at the top of the cache hierarchy, placing an operation on the bus between the processor and the first off-board cache. The first off-board cache then propagates the operation, if necessary, to the next lower level cache, if it exists, which then repeats the propagation down the cache hierarchy, if necessary, until the operation finally arrives at the system bus.

Once the operation has arrived at the system bus, it is then snooped by all the caches monitoring the system bus. After a snooping cache detects an operation, it must determine whether or not the execution of the snooped operation can proceed. A cache may be unable or refuse to accept (execute) a snooped operation for any number of reasons. For example, the resources necessary to execute an operation, such as the cache directory or state machines to process the snooped operation may be busy with other work and unable to process the snooped operation. In general, most system bus protocols allow any operation to be refused when a bus participant is unable to process the operation.

If the snooping cache cannot process the operation, then it will send a "RETRY" signal on the system bus. The RETRY signal informs the initiator of the operation that execution thereof was unsuccessful, and that the operation should be re-tried, if still necessary, at a later point in time.

The amount of time that a participant has in order to make a decision concerning the acceptance of a snooped operation, and to send a snoop response (e.g. "RETRY") is usually fixed for any given system via the bus protocol. Unfortunately, there are certain operations, due to their very nature, for which it is essentially impossible to determine the snoop response in the fixed period set by most bus protocols.

In example, the PowerPC™ architecture uses a TLBSYNC operation which requires that all TLBIE operations previously issued by the processor issuing the TLBSYNC have completed on all other processors in the system. As a direct result of the above requirement, all other processors in the system must be polled in order to determine if the previously issued TLBIE operations have completed. In this case, the TLBSYNC operation must be propagated from the system bus to the top of each of the cache hierarchies to interrogate the other processors in the system. Those skilled in the art will readily recognize that a variable amount of time is required in order to propagate the TLBSYNC operation from the system bus to the processors at the top of each of the cache hierarchies. Thus making it extremely difficult, if not impossible, to determine the "correct" snoop response (e.g. "RETRY/No RETRY") within the fixed time period set by most bus protocols.

It is just these types of operations which increase the likelihood of a deadlock occurring within the system. For example, assume that an operation is placed on the system bus by one participant (i.e. an initiator) and snooped by two other participants (recipients). During the first initiation of the operation, both recipients snoop the operation, transmit a "RETRY" signal on the system bus, and begin propagating the operation to the top of their respective cache hierarchies.

Note that recipients must initially respond RETRY. For the TLBIE/TLBSYNC example, it is possible that there are previously unfinished TLBIE operations present in other processors and the TLBSYNC cannot be allowed to complete in the event unfinished TLBIE operations exist in the processors. The lowest level cache cannot determine whether previous TLBIE operations are present until the processors at the top of each of the cache hierarchies have been polled.

In response to receiving the RETRY signals, the initiator waits a potentially variable period of time before re-initiating the operation. In the current example, also assume that before the initiator re-attempts the operation, the first snooper finishes the execution thereof, and the second snooper fails to complete the execution of the operation. Thus, the scenario for the occurrence of a deadlock is created.

After the operation is re-attempted (second time) by the initiator, the second snooper transmits a "RETRY" signal on the system bus. Since the first snooper has already completed the operation (as first initiated), it accepts the re-attempt as a new operation, thus beginning again the propagation of the operation to the top of its cache hierarchy.

In the current example, further assume that the second snooper has now completed the operation (first attempt), and the initiator now has, once again, re-attempted (third attempt) the operation on the system bus. In this scenario, the second snooper accepts the re-attempt as a new operation, and the first snooper transmits a "RETRY" signal on the system bus.

Further assume that the first snooper has completed the operation (second attempt). Once again, the initiator re-attempts (fourth time) the operation on the system bus, and the above noted process repeats indefinitely. This type of repetition is known in the industry as a "Ping-Pong deadlock".

Note that, in general, a Ping-Pong deadlock scenario can exist when there are more than two recipients as described above. In the most general case, a Ping-Pong deadlock can occur whenever one or more participants have not finished an operation and at least one participant has finished an operation when it is re-presented by the initiator. The snooper or snoopers that have finished the operation can change dynamically between initiations of the operation. This makes a Ping-Pong deadlock more likely to occur in systems with larger numbers of participants.

It would, therefore, be a distinct advantage to have a method and apparatus that would allow execution of singly-sourced, singly-initiated variable time operations while avoiding a Ping-Pong deadlock. The present invention provides such a method and apparatus.

SUMMARY OF THE PRESENT INVENTION

The present invention is a method and apparatus for preventing the occurrence of deadlocks from the execution of singly-initiated singly-sourced variable delay system bus operations. In general, each snooper accepts a given operation at the same time according to an agreed upon condition. In other words, the snooper in a given cache can accept an operation and begin working on it even while retrying the operation. Furthermore, none of the active snoopers release an operation until all the active snoopers are done with the operation. In other words, execution of a given operation is started by the snoopers at the same time and finished by each of the snoopers at the same time. This prevents the ping-pong deadlock by keeping any one cache from finishing the operation before any of the others.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
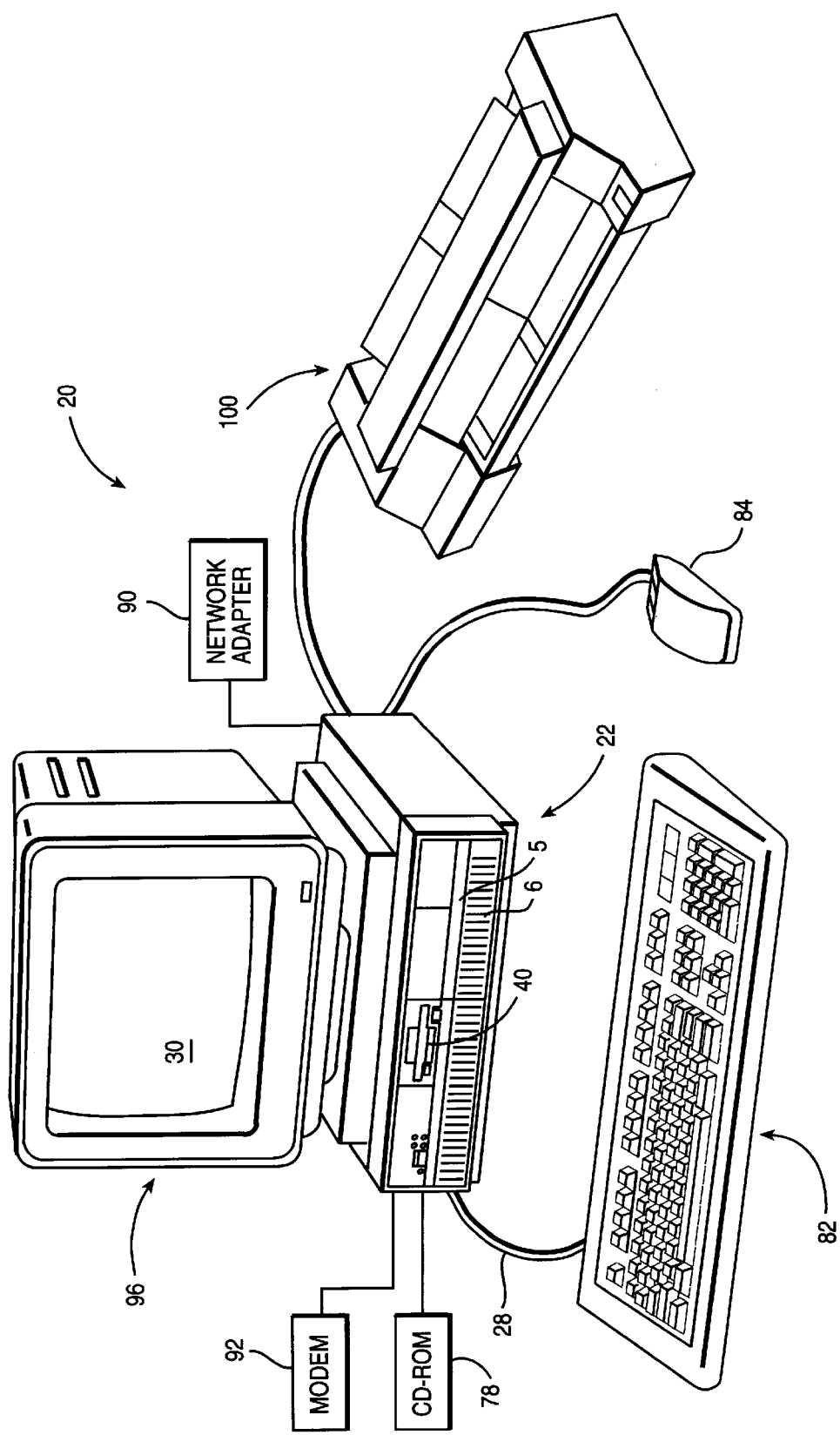
FIG. 1 is a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or by a mouse as illustrated. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
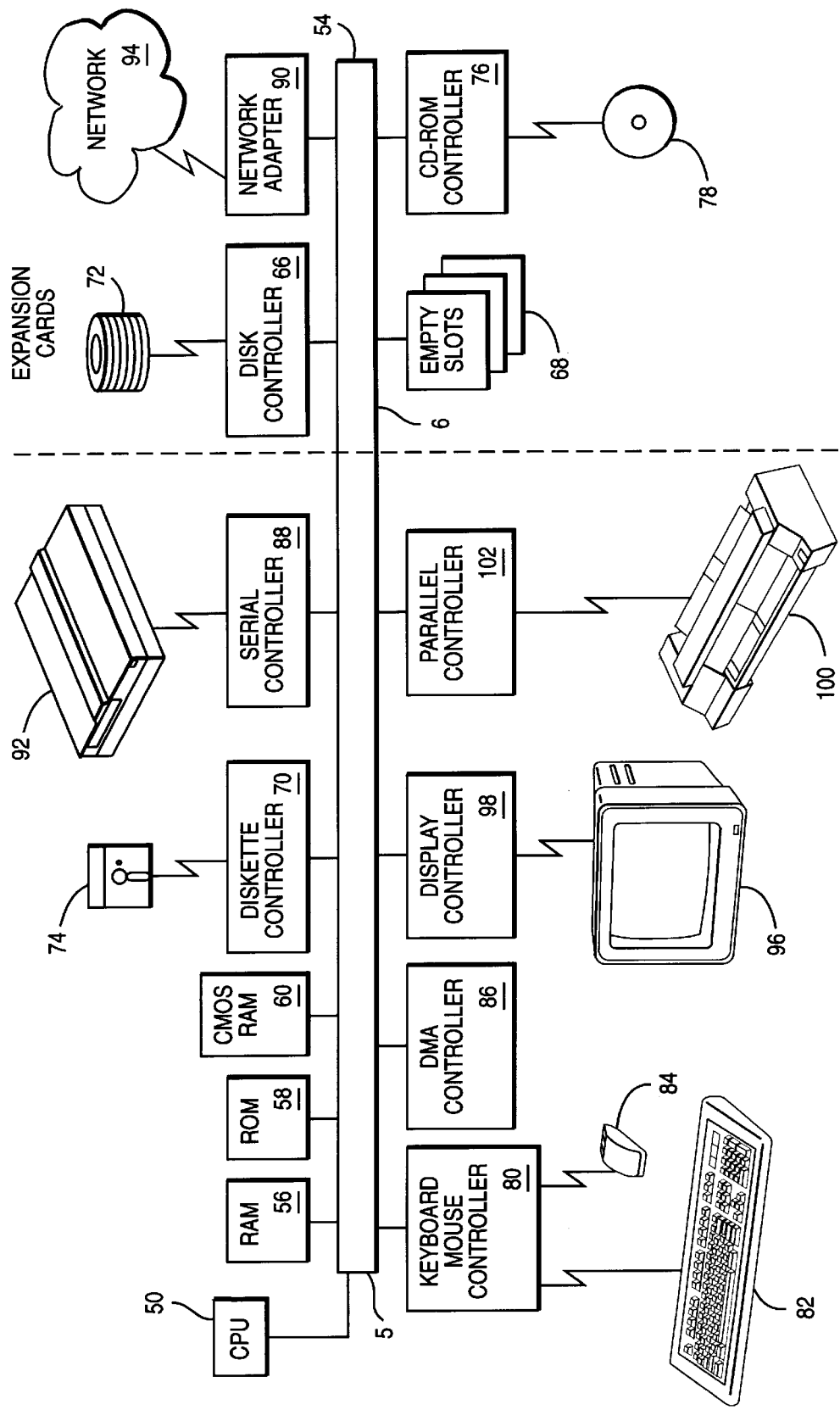
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. Rooms contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software or information, such as a server, an electronic bulletin board, the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other types of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Variable time operations in such computing systems have two essential characteristics. The first of these is whether the operation can be, during a given time interval, initiated by multiple participants. In other words, whether more than one participant can have the given operation outstanding at a given point in time. Hereinafter, this characteristic will be referred to as being singly- or multiply-sourced. If a given operation is only permitted to be issued until completion by one participant at a time, the operation will be referred to as singly-sourced. Likewise, if the operation may be outstanding from more than one participant simultaneously, it will be referred to as multiply-sourced.

Furthermore, operations can be characterized as multiply-initiated or singly-initiated. An operation is singly-initiated if any given participant is only allowed to have one operation of the given type outstanding at a time. Likewise, if a participant is allowed to have multiple operations of the given type outstanding at a time, the operation is referred to as multiply-initiated. Multiply-initiated operations require that an "address" be presented on the bus with the operation to distinguish between the various instances of the operation outstanding at any given moment in time.

Most bus protocols include a number of signals that are referred to collectively as the address of an operation. However, in what follows, address is construed to only mean that portion of the signals in the bus protocol that are necessary to distinguish between different instances of a multiply-initiated operation. These signals can correspond to the address signals for the given bus protocol, some subset of the address signals for the given bus protocol, or either of the aforementioned with such other signals in the bus protocol as are necessary to distinguish between multiply-initiated operations.

It is possible for an operation to be singly-sourced, but multiply-initiated and likewise for an operation to be multiply-sourced, but singly-initiated. One characteristic (multiply-sourced vs. singly-sourced) determines the number of participants allowed to have an operation of a given type outstanding. The other characteristic (multiply-initiated vs. singly-initiated) determines the number of operations of a given type a participant is allowed to have outstanding simultaneously. Typically these characteristics of operations are defined by the "architecture" of the given computer system and the computer system will not function correctly if software violates these restrictions, by, for example, having multiple processors simultaneously issue a singly-sourced operation.

The apparatus of the present invention provides a means and a system for deadlock free execution of singly-sourced, singly-initiated operations.

Figure 3:
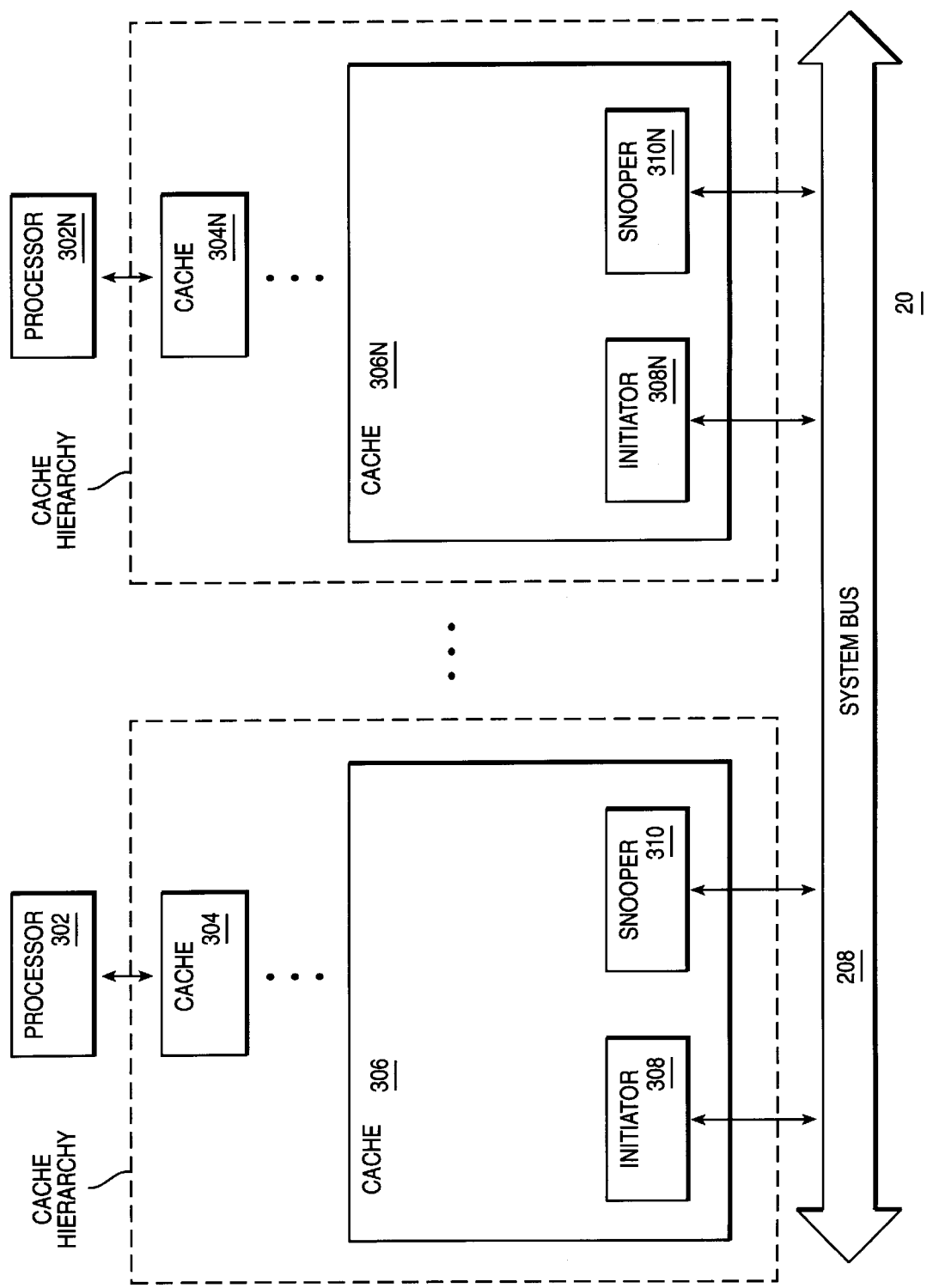
FIG. 3 is a schematic diagram illustrating in greater detail a preferred embodiment of the computer system of FIG. 1 according to the teachings of the present invention.

Reference now being made to FIG. 3 a schematic diagram is shown illustrating in greater detail a preferred embodiment of the computer system 20 of FIG. 1 according to the teachings of the present invention. As shown, the preferred embodiment is a multi-processor (302-n) environment that includes a cache hierarchy (304-n to 306-n). The last cache in the hierarchy (i.e. the one closest to the system bus 208) (306-n) operates in accordance with the protocols of the present invention.

Cache 306 is representative of caches 306-n, and therefore, the discussion hereinafter with respect to cache 306 is equally applicable to caches 306n. Cache 306 includes an initiator 308, and a snooper 310.

The protocol of the preferred embodiment of the present invention is divided into two separate parts: an initiator protocol, and a snooper protocol. The initiator and snooper protocols are independent of one another, and communicate by passing transactions over the system bus 208. For clarity, a more basic version of the protocol of the present invention is first described. This basic version of the protocol supports only one operation that is singly-initiated and singly-sourced. If the computer system has multiple different operations (say due to different instructions) that are singly-sourced and singly-initiated but are otherwise independent of one another, the basic protocol and mechanism of the present invention as described in conjunction with FIGS. 4 and 5 must be replicated for each such operation. An enhancement of the basic protocol that removes this restriction and allows multiple distinct singly-initiated, singly-sourced operations to be accommodated without mandatory replication will be described hereinafter as an extension of the basic protocol.

In the preferred embodiment of the present invention, these protocols are implemented via the initiator 308 and snooper 310.

The protocol for the initiator 308 includes the following:
1) the operation is presented to the initiator 308 from the cache above this one (e.g. cache 304); and
2) In response to the above, the initiator 308 presents the operation unto the system bus 208 until it succeeds without RETRY.

For singly-initiated operations, the initiator 308 accepts only one operation at a time, and carries the operation through to completion before accepting a subsequent operation.

Figure 4:
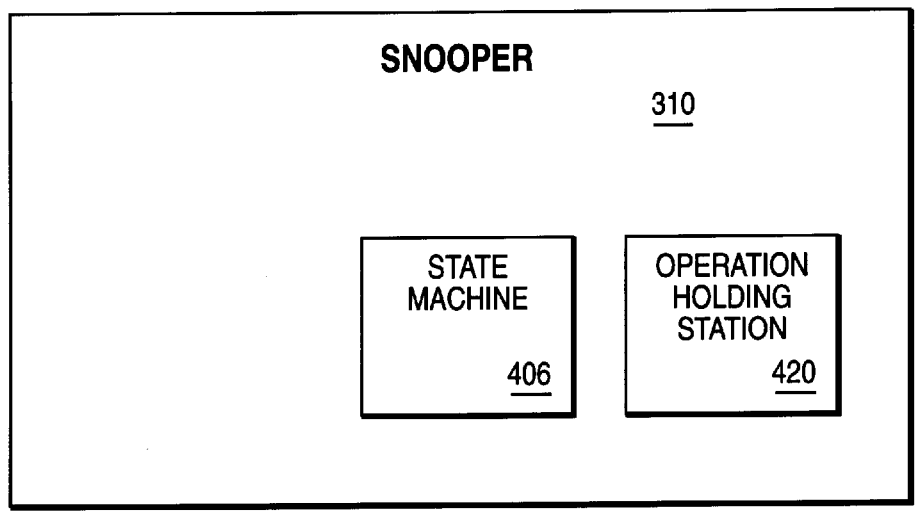
FIG. 4 is a block diagram illustrating in greater detail the snooper of FIG. 3 according to the basic protocol as defined by the teachings of the present invention.

Reference now being made to FIG. 4, a block diagram is shown illustrating in greater detail snooper 310 of FIG. 3 according to the basic protocol as defined by the teachings of the present invention. Snooper 310 includes a state machine 406, and an operation holding station 420. The operation holding station 420 contains the information from the system bus 208 for the operation that must be propagated up the cache hierarchy in order to perform the given operation. State machine 406 implements the snooper protocol which is described in greater detail in connection with FIG. 5 hereinafter. It should be noted, however, that the operation holding station 420 is only valid if the state machine 406 is not in the IDLE state.

Figure 5:
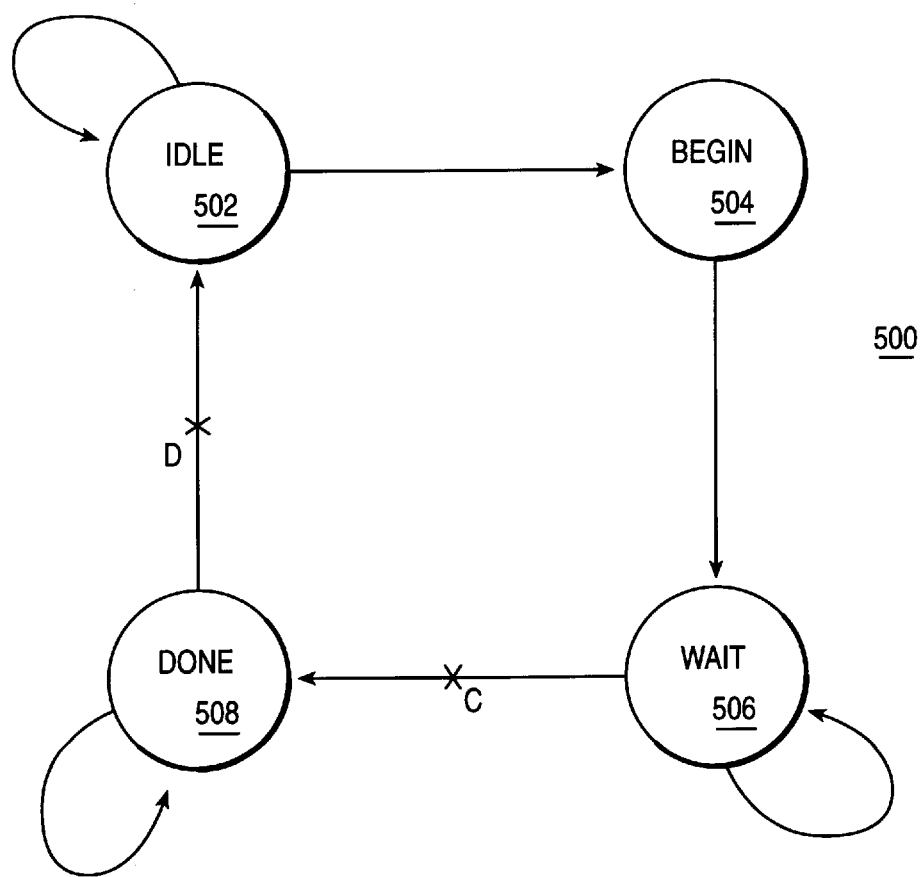
FIG. 5 is a state diagram illustrating the implementation of the state machine of FIG. 4 for executing the basic snooper protocol according to the teachings of the present invention.

Reference now being made to FIG. 5, a state diagram 500 is shown illustrating the implementation of state machine 406 of FIG. 4 for executing the basic snooper protocol according to the teachings of the present invention. As shown in FIG. 5, state machine 406 moves through the following three phases in the protocol:
1) waiting for an operation (idle (502));
2) propagating an operation up the hierarchy (begin (504) and wait (506)); and
3) finished propagating the operation, waiting for the operation to be repeated on the system bus (208) so that completion thereof is accomplished (done (508)).

In what follows, a snooper state machine (406) will be referred to as active if the state machine (406) is not in the IDLE state (502). Also, a snooper state machine (406) will be referred to as processing an operation if the state machine is in the BEGIN (504) or WAIT (506) states. In order to further clarify the various aspects of the preferred embodiment of the present invention, state machine 406 is explained hereinafter in connection with caches 306-n.

Initially all snoopers 310-n begin in the IDLE state (502). When an operation, handled by the present invention, is placed on the system bus 208 and the snoopers 310-n are not active (i.e. in the IDLE state (502)), the state machines 406-n for all caches (306-n), except the cache (306-n) initiating the operation, move from IDLE state (502) to the BEGIN state (504), and latch the pertinent information for the operation into the operation holding station 420.

The snooper state machine (406) determines if an operation is from the initiator (308) within it's own cache, and therefore, whether or not to proceed from IDLE (502) to BEGIN (504), either by a direct signal from the initiator (308) or by an indication included with the bus operation denoting the participant sourcing the operation onto the system bus.

Many existing bus protocols have signals dedicated to "tagging" operations and it is often possible to re-use these signals to indicate the participant sourcing an operation onto the bus. If such signals are unavailable or unusable, it is a trivial matter to add a number of additional side-band signals to an existing protocol as an indication of the source of an operation.

It should be noted that when a snooper state machine 406 is first activated by moving from IDLE (502) to BEGIN (504), the bus operation is retried by the snoopers 310-*n*. The operation cannot be allowed to complete on the system bus (208) (no retry) until the operation has been presented to and completed on the processors (302-*n*) in the system. Therefore, a snooper (310) must retry an operation when first activated to process it.

In the BEGIN (504) state, the snooper 310 takes whatever actions necessary to start propagating the operation up the cache hierarchy. From the BEGIN (504) state, the snooper (310) unconditionally moves to the WAIT (506) state, where it waits for the operation to completely propagate to the top of the cache hierarchy and succeed. When the operation has succeeded on the local processor 302-*n*, snooper 310 moves through state machine arc C to the done (508) state.

If, while processing an operation, the snooper detects (snoops) a re-initiation of the operation on the system bus 208, the snooper 310 will drive a retry indication to the system bus 208. Unrelated operations of the bus protocol not handled by the mechanism of the present invention are ignored by the snooper (310). More specifically, if any of the snoopers 310-*n* meet the following conditions, then the snooped operation is currently being processed, and the snooped operation is retried:

1) currently in the BEGIN (504) or WAIT (506) state; and
2) the type of operation on the system bus (208) corresponds to the type of operation that the snooper machine is defined to process.

If it is determined that the snooper 310 is currently processing the snooped operation, then the snooped operation is re-tried by snooper 310, and snooper state machine 406 does not change state due to the snooped operation. On the system bus 208, retry is the logical OR of all the individual retry indications of all participant snoopers 310-*n*.

Once in the DONE (508) state, the operation has been successfully completed on the local processor (302-*n*) and the snooper 310 stops retrying the operation when it is re-presented on the system bus 208. As the snoopers 310-*n* processing this operation in the different caches 306-*n* proceed to the DONE (508) state, eventually no snooper 310-*n* will RETRY the operation when re-presented by the initiator (308-*n*).

Once all active snoopers 310-*n* cease retries, the next instance the initiator 308 presents the operation on the system bus 208 will not be retried and the operation is complete. When the snoopers 310-*n* detect that the operation has completed, by observing the operation on the system bus without retry, all active snoopers 310-*n* concurrently move through arc D from the DONE (508) state to IDLE (502) state. This completes the operation and the snoopers 310-*n* are available to process the next assigned operation.

This protocol avoids deadlock by having a snooper 310 in every cache 306-*n*, except the initiating cache, accept the operation at the same time according to an agreed upon condition. In other words, the snooper 310 in a given cache can accept an operation and begin working on it even while retrying the operation, since the snooper 310 can infer that all other caches 306-*n* in the system except the cache of the initiating participant will also, by convention, be accepting the operation and beginning to process it as well.

Furthermore, none of the active snoopers 310-*n* release an operation (proceeds from DONE (508) state to IDLE (502) state) until all of the active snoopers 310-*n* are done with the operation. Execution of a given operation is started by the snoopers 310-*n* at the same time and finished by the snoopers 310-*n* at the same time. This prevents the Ping-Pong deadlock by keeping one cache 306-*n* from finishing the operation before any of the others.

It is assumed in the description above that the effects of the operation are completed on the local processor 302-*n* before the operation is presented to the initiator 308. As such, the operation does not need to be propagated from the system bus 208 to the initiating processor 302-*n*. Therefore, the initiating processor's 302-*n* snooper 310 does not need to participate in the snooping protocol.

It is possible, however, to have a system in which the operation is not completed on the local processor 302-*n* before being presented to the initiator 308. In such a system, the snooper state machine 406 on the initiating participant's cache would then have to be activated just as the snooper machines 310-*n* on the non-initiating participants are activated. This change in the protocol is minor and will be apparent to those skilled in the art.

The appropriate implementation choice depends on the whether the operation is completed on the local processor 302-*n* before being presented to the initiator 308 or if the snooper 310 is expected to present the operation to the local processor 302-*n*. Having the snooper 310 present the operation to the local processor 302-*n* is referred to as "self-snooping" and is a technique well known to those skilled in the art.

The basic version of the protocols for the present invention require that the structures of FIGS. 4 and 5 are duplicated for each unique singly-initiated, singly-sourced operation present in the system. It is possible, however, to augment the basic protocol of the invention to allow multiple different singly-initiated, singly-sourced operations to be processed without mandatory replication of these hardware structures. This protocol will be referred to hereinafter as the advanced protocol.

Figure 6:
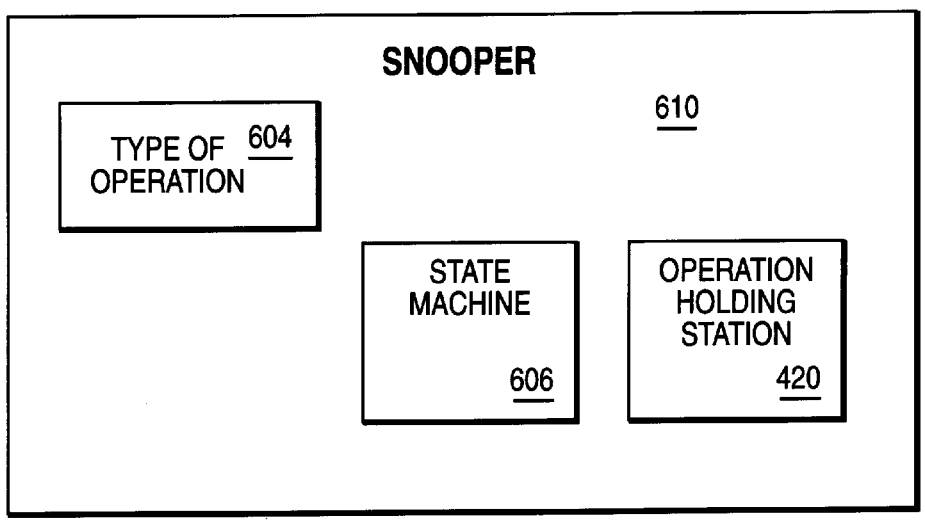
FIG. 6 is a block diagram illustrating in greater detail an enhanced snooper which can be substituted for snoopers of FIG. 3 according to the teachings of the preferred embodiment of the present invention.

Reference now being made to FIG. 6, a block diagram is shown illustrating in greater detail an enhanced snooper 610 which can be substituted for snoopers 310-*n* of FIG. 3 according to the teachings of the preferred embodiment of the present invention. In comparison with the basic snooper 310 shown in FIG. 4., the enhanced snooper 610 has an additional indicator (604) used to indicate the type of operation being processed.

This "type of operation" indicator 604 is used to maintain, within the various snoopers 610-*n*, the type of the operation being processed. In similarity to the snooper 310 in the basic protocol, in the advanced protocol snooper 610, this operation type is loaded with the type of operation on the system bus (208) when a snooper state machine 606 is activated (i.e. leaves the IDLE state).

Furthermore, when operations are snooped on the system bus (208) by an active snooper 610, the operation type indicator (604) is compared with the type of operation on the system bus when determining if the operation being presented on the system bus 208 corresponds to the one that activated the snooper 610. This allows a single snooper 610 the capability to process a number of different singly-sourced, singly-initiated transactions and removes the need to duplicate the snoopers 310-*n* for each different singly-sourced, singly-initiated operation in a system.

If an active snoop machine 606 (not in the IDLE state) detects an operation on the system bus (208) that can potentially be processed by the snoop machine 610, but does not match the type of operation that activated the snooper machine 610, then the snooper machine 610 will retry the operation. This retry is necessary due to the fact that there is only one snooper present in each of the lowest level caches (306-*n*).

Once an operation is operated on by the snoopers 310, any distinct subsequent operation must be retried until all snoopers 610-*n* are available to begin processing the subsequent operation. This is an additional cause of retry that the advanced protocol adds to the causes of retry which were present in the basic protocol (e.g. initially starting an operation and detection of re-initiation of an operation while being processed).

In addition to the operation type indicator 604, the enhanced snooper 610 also contains an augmented state machine (606) to support processing multiple differing singly-initiated, singly-sourced operations.

Figure 7:
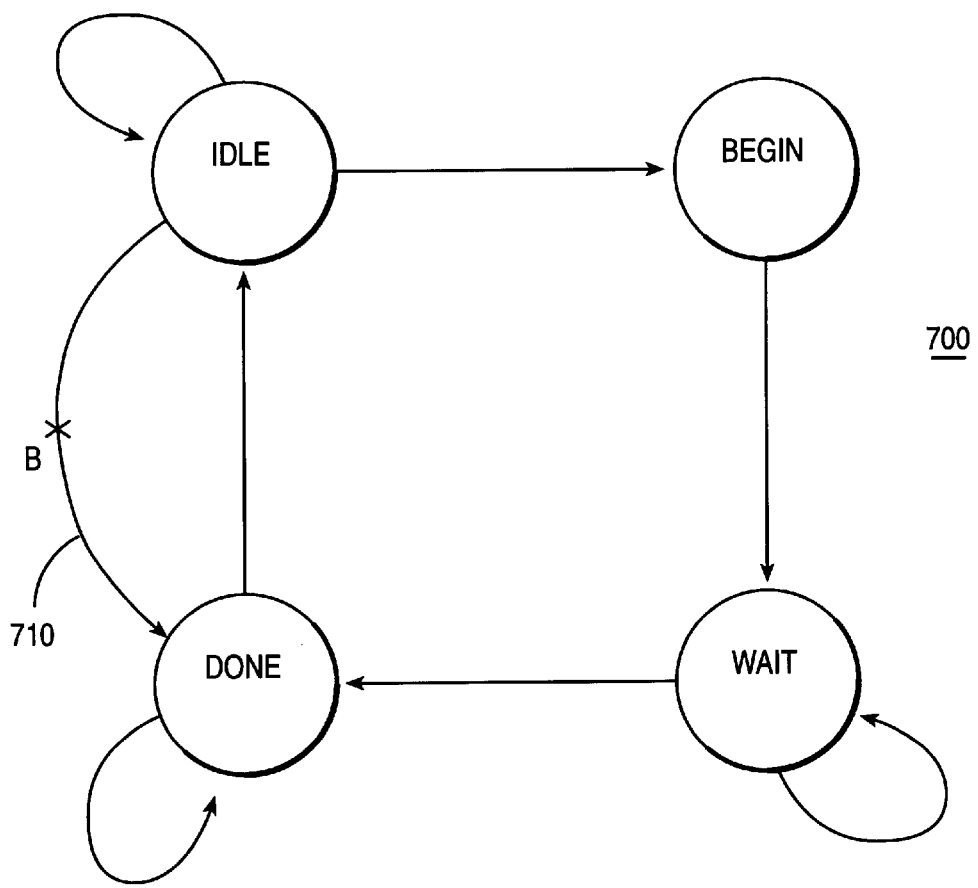
FIG. 7 is a state diagram illustrating the implementation of the augmented state machine of FIG. 6 for executing the advanced snooper protocol according to the teachings of the preferred embodiment of the present invention.

Reference now being made to FIG. 7, a state diagram 700 is shown illustrating the implementation of the augmented state machine 606 of FIG. 6 for executing the advanced snooper protocol according to the teachings of the preferred embodiment of the present invention. The augmented state machine 606 adds an additional arc B (710) leading from the IDLE to DONE state not present in the unaugmented state machine (406) of FIG. 5.

In the basic protocol, the snooper state machine 406 for the initiating participant remains in the IDLE state when an operation is first placed on the bus for processing. However, in the advanced protocol, when the snooper state machine 606 of the initiating participant is in the IDLE state and detects an applicable operation being presented on the system bus, the snooper state machine 606 proceeds through arc B to the state DONE directly. This effectively prevents snooper 610 from spuriously accepting a different singly-initiated, singly-sourced operation from another participant until the operation initiated by the current participant has been completed.

In other words, in the advanced protocol, when an operation is first initiated onto the system bus 208, all of the snoopers 610-*n* within the system, including the snooper 610 for the initiating participant, are activated to process the operation. The snooper 610 for the initiating participant moves directly to the DONE state to await the successful completion of the operation. All other snoopers 610-*n* proceed through the execution of the states as described in the basic protocol causing the operation to be presented and completed on all other processors.

If, in the advanced protocol, the initiating snooper machine 610 were left in the IDLE state when an operation is first beginning to be processed as is done in the basic protocol, a deadlock can occur in the advanced protocol. To avoid such difficulties, the advanced protocol requires that all snooper machines 610, including the initiating participant's, be activated when the operation is first presented on the system bus 208.

The advanced protocol insures that all snooper machines 620-*n* are activated (move from the IDLE state to BEGIN state, or from the IDLE state to DONE state) at the same time. Furthermore, all snooper machines 610-*n* are deactivated (move from the DONE state to IDLE state) at the same time. This same circumstance occurs in the basic protocol when self snooping is supported: all snooper state machines 406 move from the IDLE to BEGIN states at the same time and all snooper state machines 406 move from the DONE to IDLE states at the same time.

The above description of the advanced protocol of the present invention is based on the assumption that the effects of the operations processed by the present invention are complete on the local processor (302-*n*) before the operation is presented to the initiator 308. If this condition does not hold and the computer system uses self-snooping, the augmented state machine 606 described above for the advanced protocol must be replaced with the unaugmented state machine 406 described in FIG. 5.

Furthermore, the behavior of the unaugmented state machine 406 described in FIG. 5 must be altered such that the state machine 406 proceeds from the IDLE (502) state to the BEGIN (504) state even in the event that the operation snooped is from the initiating processor (302-*n*). This is the same modification to the state machine 406 of FIG. 5 that is necessary in the basic protocol to support self-snooping. As was the case without self-snooping, the self-snooping version of the advanced protocol insures that all snooper state machines 606-*n* are activated at the same time and are deactivated at the same time. This prevents ping-pong deadlock from occurring.

As described, the advanced protocol will serialize the execution of differing singly-initiated, singly-sourced operations. Consider a system with five distinct singly-sourced, singly-initiated operations. If, in such a system, more than one processor is attempting to concurrently execute differing ones of these operations, the mechanisms of the advanced protocol will serialize the execution thereof. More specifically, some processor's operation will be the first presented on the system bus 208. This operation will begin processing. Until this first operation has completed, no other singly-sourced, singly-initiated operation will be able to execute. The advanced protocol, while able to process different operations, is unable to process these operations concurrently. This leads to lower performance that is, in many cases, acceptable. This serialization can also lead to higher level system deadlocks.

However, in cases where such a performance degradation is unacceptable or can lead to higher level system deadlocks, the structures of the advanced protocol can be extended to allow the simultaneous execution of differing singly-initiated, singly-sourced operations.

Figure 8:
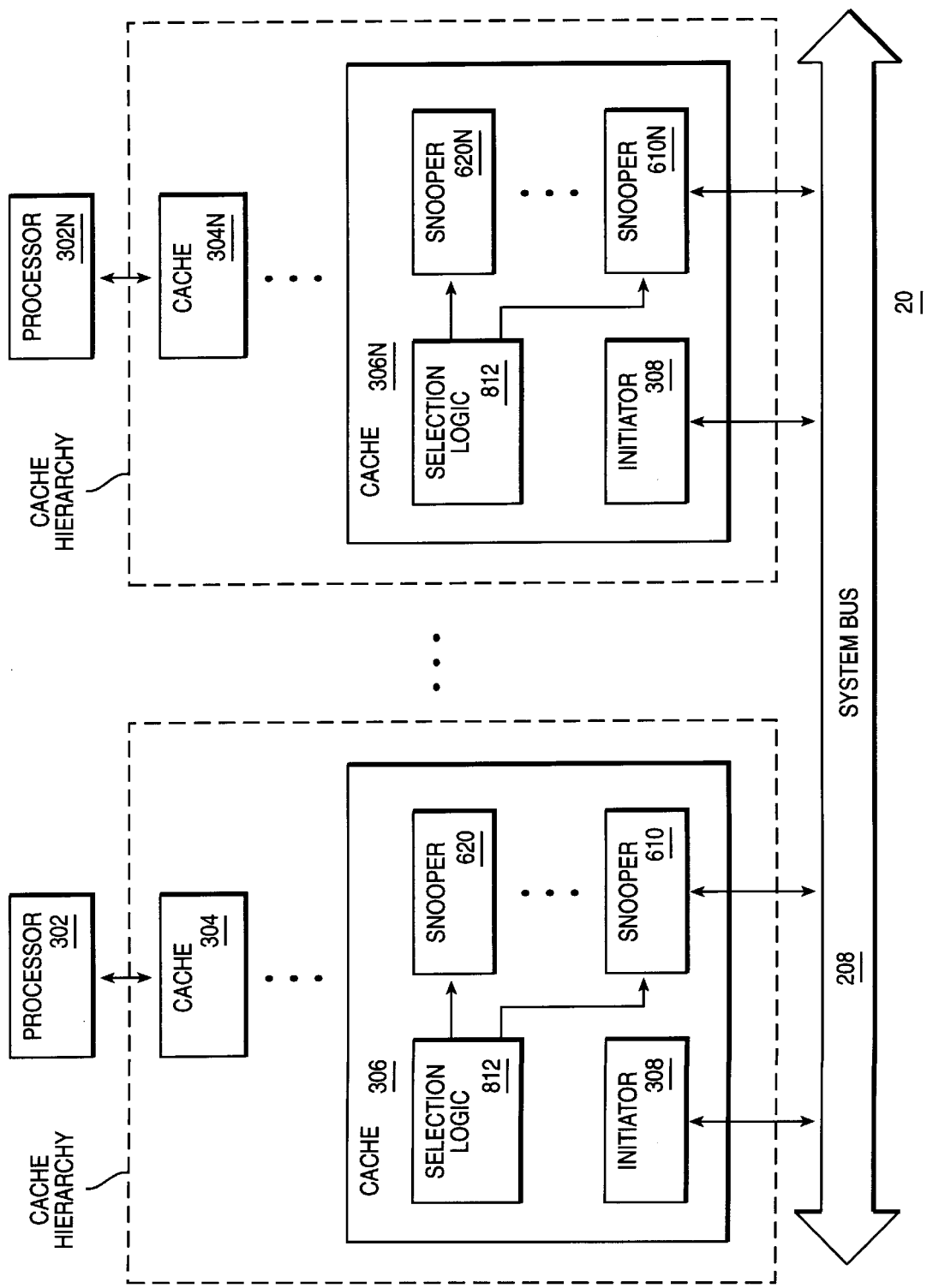
FIG. 8 is a schematic diagram of the computer system of FIG. 1 illustrating the modifications to the caches for allowing concurrent executions of multiple signally-initiated, singly-sourced operations according to the teachings of the present invention.

Reference now being made to FIG. 8, a schematic diagram of the computer system 20 of FIG. 1 illustrating the modifications to caches 306-*n* for allowing concurrent execution of multiple singly-initiated, singly-sourced operations according to the teachings of the present invention. It should be noted that all components other than caches 306-*n* retain their originally functionality as previously described in connection with FIG. 3.

To facilitate concurrent execution, each lowest level cache 306-*n* is provided with a plurality of snoopers 610–620. Each snooper 610–620 is connected to the system bus 208 in parallel. Therefore, each snooper 610–620 is concurrently polled when any applicable operation appears on the system bus.

The number of snoopers 610–620 per cache is typically less than the number of distinct singly-initiated, singly-sourced operations present in the computing system, but greater than one. If the number of snoopers 610–620 is equal to the number of distinct singly-sourced, singly-initiated operations in the system, the amount of replication is the same as if the basic protocol is used and the structures are simply replicated for each individual instruction.

In addition, each cache 306-*n* is provided with a selection logic unit 812. Unit 812 manages the selection of a snooper 610–620 from the plurality of snoopers 610–620 to process an operation. Furthermore, unit 812 is responsible for retrying operations when all snoopers 610–620 are active and therefore, no snooper 610–620 can process an operation.

As before, all snoopers 610–620 start in the IDLE state. Once an applicable operation is snooped, the snooper selection logic unit 812 selects an available snooper 610–620 from amongst snoopers 610–620 to execute the operation. The selected snooper 610–620 performs the initial retry of the operation demanded by the advanced protocol, and is activated to execute the operation. In the multiple snooper 610–620 implementation of the advanced protocol, the individual retry indications of snoopers 610–620 are logically OR'ed to produce the retry indication for cache 306. It should be noted that it is not necessary for each of the selection logic units 812-n to select the same snooper 610–620 from amongst the snoopers 610–620 in each cache 306-n. It is sufficient that at least one snooper 610–620 is selected.

Once a snooper 610–620 is activated in each of the caches 306-n, the same sequence of steps as in the single-snooper implementation of the advanced protocol is followed with one exception. In the single snooper implementation, a snooper 610-n retries any snooped bus operation that could potentially be processed by the snooper 610-n, but that differs from the one being currently executed by an active snooper 610-n. In the single snooper implementation, this condition occurs when an operation is placed on the system bus 208 and the single snooper is currently active. In this case, there are no snoopers 610-n available to process the operation.

In the multiple snooper implementation, this condition does not occur until all snoopers 610–620 are active. Therefore, in the multiple snooper implementation, individual snoopers 610–620 do not retry an operation differing from the one that activated the snooper 610–620. Rather, the selection logic unit 812 detects that all snoopers 610–620 are active and retries any operation not currently being executed by an active snooper 610–620. The selection logic unit 812 only retries operations not being operated on by any active snooper 610–620 when all snoopers 610–620 are active. If an operation is currently being handled by an active snooper 610–620, that snooper 610–620 produces the retry/no retry indications according to the protocols described earlier.

As in the single snooper implementation of the advanced protocol, the multiple snooper implementation activates a snooper 610–620 in each cache 306-n at the same time to execute a given applicable operation. These activated snoopers 610–620 are also released (transition back to the IDLE state) at the same time. By allocating a snooper 610–620 and releasing a snooper at the same time in each of the caches 306-n, the protocol avoids a ping-pong deadlock. Further, the multiple independent snoopers 610–620 allow the concurrent execution of multiple differing singly-sourced, singly-initiated operations.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. An apparatus comprising:
   a plurality of central processing units for executing instructions;
   memory for storing data;
   a system bus for communicating the stored data between the memory and each one of the central processing units;
   a cache for each one of the central processing units for storing data retrieved from the memory, the cache including:
      means for processing snooped operations of differing characters which can only be supplied by one processor at any given time and which can be initiated by the same processor once, said means for processing provides an indication of the type of operation the cache is currently processing;
      means for indicating that the current operation has been completed only after all other caches have indicated completion of the same operation;
      at least two snoopers, including:
         means for processing snooped operations of differing characters which can only be supplied by one processor at any given time and which can be initiated by the same processor once;
         means for indicating the type of operation the cache is currently processing;
         means for indicating that the current operation has been completed only after all other caches have indicated completion of the same operation; and
         means for initiating an operation onto the system bus until all caches have indicated completion of the operation.

2. The apparatus of claim 1 wherein each of the caches further comprise:
   selection means for selecting which one of the snoopers will process a snooped operation.

3. The apparatus of claim 2 wherein the selection means further includes:
   means for comparing the snooped operation with those operations currently being processed by each of the snoopers; and
   means for indicating to the initiating means when all snoopers are currently busy processing operations other than the snooped operation.

4. The apparatus of claim 3 wherein each of the snoopers includes:
   means for indicating to the initiating means that a snooped operation is already being processed and is incomplete.

5. A method comprising the steps of:
   executing instructions by a plurality of central processing units;
   storing data in a memory;
   communicating, by a system bus, the stored data between the memory and each one of the central processing units;
   storing data retrieved from the memory in a cache associated with each one of the central processing units, the step of storing including the steps of:
      processing snooped operations of differing characters which can only be supplied by one processor at any given time and which can be initiated by the same processor once, said step of processing includes providing an indication of the type of operation the cache is currently processing;
      indicating that the current operation has been completed only after all other caches have indicated completion of the same operation;
      providing at least two snoopers in each said cache, said snoopers performing the steps of:
         processing snooped operations of differing characters which can only be supplied by one processor at any given time and which can be initiated by the same processor once;

indicating the type of operation the cache is currently processing;

indicating that the current operation has been completed only after all other caches have indicated completion of the same operation; and initiating an operation onto the system bus until all caches have indicated completion of the operation.

6. The method of claim 5 further comprising the step of selecting, by said cache, which one of the snoopers will process a snooped operation.

7. The method of claim 6 wherein the step of selecting further comprises the steps of:

comparing the snooped operation with those operations currently being processed by each of the snoopers; and indicating when all snoopers are currently busy processing operations other than the snooped operation.

8. The method of claim 7 wherein the step of providing at least two snoopers, comprises the step of providing an indication that a snooped operation is already being processed and is incomplete.

* * * * *